United States Patent
Despres et al.

(10) Patent No.: US 6,434,379 B1
(45) Date of Patent: Aug. 13, 2002

(54) METHOD FOR DYNAMIC MANAGEMENT OF A PREPAID TERMINAL SUBSCRIPTION

(75) Inventors: François Despres, Bievres; Céline Hagiarian, Paris; Christine Le Fiblec, Malakoff, all of (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/445,709
(22) PCT Filed: Jun. 9, 1998
(86) PCT No.: PCT/FR98/01175
§ 371 (c)(1),
(2), (4) Date: May 10, 2000
(87) PCT Pub. No.: WO98/57488
PCT Pub. Date: Dec. 17, 1998

(30) Foreign Application Priority Data

Jun. 10, 1997 (FR) .............................................. 97 07173

(51) Int. Cl.[7] .................................................. H04Q 7/20
(52) U.S. Cl. .................. 455/406; 455/407; 379/114.15; 379/114.2
(58) Field of Search ................................ 455/406, 407, 455/403, 558, 410, 408; 379/114.01, 114.05, 114.15, 114.16, 114.17, 114.2, 127.04, 327.01

(56) References Cited

U.S. PATENT DOCUMENTS

| | | | | |
|---|---|---|---|---|
| 5,511,114 A | * | 4/1996 | Stimson et al. ............. | 379/114 |
| 5,915,226 A | * | 6/1999 | Martineau ................... | 455/558 |
| 6,028,920 A | * | 2/2000 | Carson ........................ | 379/144 |
| 6,226,364 B1 | * | 5/2001 | Oneil .......................... | 379/112 |
| 6,298,250 B1 | * | 10/2001 | Nilsson ....................... | 455/569 |

FOREIGN PATENT DOCUMENTS

| | | |
|---|---|---|
| EP | 572 991 A2 | 12/1993 |
| EP | 698 987 A2 | 2/1996 |

OTHER PUBLICATIONS

WO 96/15633.
Nouvelles possibilites de paiement, REE: Revue de l'electricite et de l'electronique (1995) Oct., No. 4, Paris, FR.

* cited by examiner

Primary Examiner—William Trost
Assistant Examiner—Congvan Tran
(74) Attorney, Agent, or Firm—Pearne & Gordon LLP (57) ABSTRACT

A process for dynamic management of subscription data for a terminal in a "prepaid" mode as part of a telecommunication network, in which a customer in possession of, or using, the terminal acquires two numbers for activating the terminal and/or crediting the terminal account. The two numbers could be acquired from a pre-paid card, for example, with the numbers hidden until a covering is scratched off by the users. The terminal must be activated on the network by first entering a authentication key, whereby the terminal obtains an identity on the network. The customer can then add an account number that creates and/or credits the terminal account on the network, whereby the terminal obtains a call number from the network. The customer can add credit to his account by purchasing additional pre-paid cards.

16 Claims, 2 Drawing Sheets

METHOD FOR DYNAMIC MANAGEMENT OF A PREPAID TERMINAL SUBSCRIPTION

DESCRIPTION

1. Technical Field

This invention relates to a process for dynamic management of a subscription for a terminal in "prepaid" mode.

2. State of Prior Art

This invention relates to a process for dynamic management of subscriptions in prepaid mode in a telecommunications network, within the framework of paying services.

The domain of the invention is telecommunications networks with mobile phones (for example CTM, DECT) and more generally any system accepting remote charging by the handset.

The invention does not claim the concept of prepaid services or cards, or the use of the intelligent network for implementing the service itself, but rather an innovative process for creating a "subscription" making use of information obtained with prepaid cards purchased by the customer, through the creation of a customer account which is actually a subscription number.

A prepaid card enables its bearer to receive a service from a service provider, the payment for this service being made in advance when the card is purchased.

A distinction has to be made between a virtual prepaid card and a non-virtual prepaid card. For a virtual prepaid card, all characteristics of the card, and particularly its credit, are managed by a centralized server. For a non-virtual prepaid card, the card itself contains this information. The telephone card is an example of a non-virtual prepaid card.

The invention only relates to virtual prepaid cards. Unlike non-virtual prepaid cards, which necessarily comprise a material device, there are two types of virtual prepaid cards:

- cards composed of a single number; these are then immaterial virtual prepaid cards;
- cards composed of a physical device; these are material virtual prepaid cards.

The use of prepaid cards has the following advantages:

- A prepaid card, when used with a cordless mobile telephone, enables an operator to protect himself against unpaid bills and limit customer/information service interactions.
- The billing system is simplified. The operator offers a conventional system for opening a subscription, involving the use of the information system to manage customers (open commercial file, send invoices, etc.) and a prepayment system for other customers (children, etc.).

The "Mobicarte" service (registered trademark) is an example of a rechargeable prepaid card. This is a service based on a process for which French patent applications (numbers 96 07761 and 96 07762 dated Jun. 21, 1996) have been deposited, and that uses a GSM smart card (SIM card) that gives a communications credit that can be recharged at any time and that offers a service operating in two steps:

The customer starts by purchasing a "Mobicarte" pack that contains a smart card (SIM) with thirty minutes of national communications valid for two months starting from the first call. This card is designed for the user to insert it in its telephone so that he can telephone immediately. The customer calls the Mobicarte server to determine his call number, and the card then allows the use of a telephone number for four months.

Once the communications credit has been exhausted, the customer can recharge his account using a thirty-minute "Mobicarte" "scratch card". The service management price is included in the communications price.

In order to telephone, the customer must firstly dial the number of the voice server that manages the service (number 222). The server activates the account and all that needs to be done then is to dial the correspondent's number. A message indicates the remaining communication credit at the end of each call.

The customer must purchase a recharge in order to keep his credit. This is in the form of a "scratch card" that can be purchased in GSM sales outlets, and which will gradually become available in all tobacconists (Government approved shops). This "scratch card" comprises a fourteen-digit code to be entered on the keyboard, after connecting to the server. The effect of this simple manipulation is to credit the card with 30 minutes communication.

The "Mobicarte" is designed for use by anyone who needs a mobile telephone occasionally, for example during a voyage in France or in the case of a holiday rental. It is also suitable for anybody who would like to remain accessible, while enabling a few calls. . . . anybody who would like to remain accessible, while enabling a few calls.

With a "Mobicarte", subscription data are created in advance in the network and are contained in the SIM card.

A document according to prior art, WO-A-96 15633, describes a system for administration of subscribers in a telecommunications network providing access to an intelligent network. This system comprises logic located at a control point in the intelligent network service and a subscribers database from a service data point associated with it by CCS signaling. Customer records in customer database are created, updated and deleted by the operator, but creation, write/read and erase functions may also be carried out through the telephone network associated with the intelligent network. The operator can activate the check without the customer being aware of it. The process thus used can be applied to the control of calls paid with a prepaid card. The user of a service then has an account code and a personal identification number (PIN). The customer call signal is directed towards the service check point using the account code as the direction key.

However, the purpose of the invention is a process for dynamic management of subscription data (in prepaid mode); creation and deletion by the database, making use of information on the "scratch card".

DESCRIPTION OF THE INVENTION

This invention proposes a process for dynamic management of subscription data for a terminal conform with a radio standard, so that data can be downloaded through a radio channel like DECT, PHS, IS-95, CT2, in "prepaid" mode, within a telecommunications network comprising at least one server, characterized in that the customer in possession of this type of terminal acquires two numbers, for example concealed on a prepaid card and in that, when a first access to the network is made from this terminal, at least the following two steps occur:

Remote personalization request from this terminal by entering the first number (authentication code supplied with the card), followed by downloading of an identity through the network into the terminal so that the terminal can be recognized.

Call the network server for this service from the terminal that indicates its identity and the user then dials this number, and if the authentication is correct, followed by the network sending a voice message to the terminal . . . authentication is verified, and at the end of this step the network actually credits the terminal account.

Advantageously, this process is such that:

in the first step:
- the network assigns a personal user identity number (IPUI) and a directory number, to this terminal,
- the network sends an acknowledgment to the terminal concerning the request for access rights and containing the user identity number,
- the network assigns a telephone number associated with the user identity number, in its database,
- the network sets a subscription flag T to be equal to "pending remote personalization", in the second step:
- the network receives a call from the terminal. This message contains the user identity number and the account number,
- the network searches for the user identity number in the database and checks that the value of the T flag is equal to "pending",
- starting from the account number, the network searches for the authentication key and the credit associated with the account,
- the network initiates a key allocation procedure,
- at the end of this procedure, the network stores the user's long authentication key, the user identity number, the equipment identity number, the authentication code and the account number. These data are kept in case the remote personalization does not take place correctly,
- if the authentication is correct, the network sends a voice message to the terminal indicating the new credit and the call number associated with the terminal,
- the network sets the subscription flag T to "remote personalized";

in the third step, during the first authentication (outgoing call, localization or incoming call):
- the network verifies that the value of the T flag is actually "remote personalized",
- if the authentication is correct, the network actually credits the terminal account, it erases the authentication code and the associated account number and sets the T flag to be equal to "subscription certified";

for subsequent outgoing calls, after correct authentication, the network is capable of:
- verifying that the terminal has sufficient units to make the call,
- sending voice messages to inform the customer that he has exceeded some thresholds,
- cutting off the current communication if the terminal has used all its units,
- decrementing units used at the end of the call and updating the remaining credit.

Advantageously, when the customer wants to credit his account, he enters a new authentication code given on a new scratch card and then:
- the network receives a call containing an access right request; this message contains the equipment identity number of the terminal;
- the network searches for this equipment identity number in the database; it finds the user identity number allocated during the first access;
- the network sends the "Access right acceptance" message containing the user identity number to the terminal allocated at the time of the first access.

The following steps take place in exactly the same way as the second and third steps described previously, the call number allocated during the first access no longer changing.

Advantageously, the customer can call a voice server at any time in order to determine his call number and the credit remaining on his account.

The invention implements this process using a prepaid card that contains two hidden scratch numbers; an authentication code and an account number.

The process according to the invention has many advantages:
- the operator can use the prepaid card to protect himself against unpaid invoices and to limit interactions between customers and the information system;
- there is no invoicing sequence for the subscription considered;
- the information system is not used for this type of subscription, which is created dynamically during the first access to the network;
- the prepaid card enables any fringe of potential customers who are unable or unwilling to pay subscriptions, setup costs or other service startup costs, to access the mobile service;
- it makes it possible to keep the same telephone number, even when adding more credit with a new prepaid card.

DETAILED DESCRIPTION OF EMBODIMENTS

Figure 1:
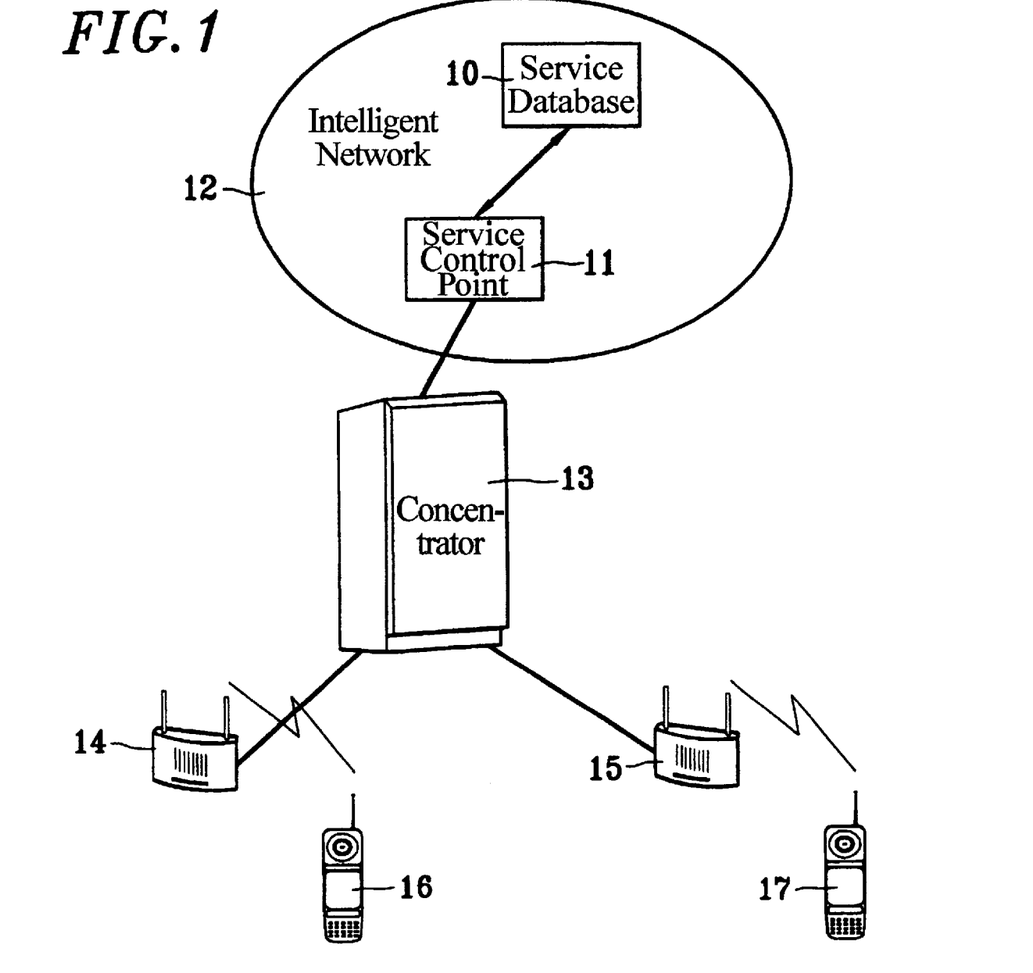
FIG. 1 illustrates an example embodiment of a telecommunications system with mobiles based on an intelligent network structure.
Figure 2:
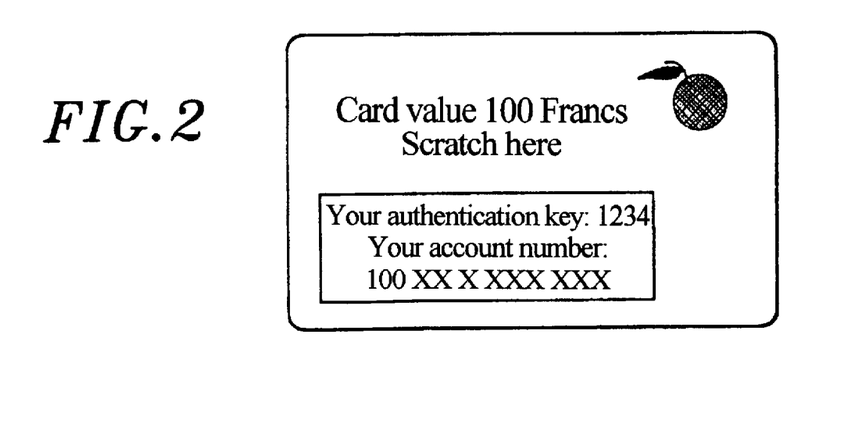
FIG. 2 illustrates a prepaid card usable with the process according to the invention.

FIG. 1 illustrates an example embodiment of a telecommunications system with mobiles, for example using the DECT standard, in radio access based on an intelligent network structure.

This figure shows a service database 10, connected through an X500 to X25 link at a service control point 11, both being located inside an intelligent network 12. The service control point 11 is connected to a concentrator 13, itself connected to base stations 14, 15 connected to mobile terminals or handsets 16 and 17 respectively.

In the process according to the invention, a customer firstly procures a terminal conform with a radio standard in order to download data by radio (for example DECT, CT2, PHS, IS-95, etc.). In order to make the radio channel operate, the customer acquires two numbers, for example concealed on a prepaid card that he purchased in any sales outlet. These two concealed numbers are an authentication key and an account number. The first number (for example a 4-digit code) is used to record the terminal on the network, the subscription data then being created dynamically, an identity used to recognize the customer during the next access on the network is downloaded into the terminal. The customer then sets up a call. By dialing the second number recorded on the card, the network credits the customer's account by the amount corresponding to the credit on the card. The network then informs the customer of his telephone number and the remaining credit, in a voice message.

Before these steps, the operator will have put "scratch cards" on sale each containing an authentication code and an account number (the network uses this account number to deduct the number of units to be credited). The database knows all "scratch cards" that are on sale. These cards are characterized by an authentication code, account number pair.

If the various steps in the process according to the invention are summarized, they are seen at the customer end as follows:

the customer procures a terminal, for example from a shop, for example of a DECT, PHS type, etc., characterized by its equipment identity number;

he does not take out a subscription with the operator or the service provider;

he can purchase specific "scratch cards" with different values in the shops, so that he can make calls from his terminal; there is a short authentication key and an account number on this card, obtained by scratching;

the customer enters the authentication code given on the "scratch card"; a "beep" informs him that he must go onto the next step, and he then hangs up;

he lifts the telephone, sets up a communication with the network, and enters the account number shown on the "scratch card", on the keypad; a voice message informs him of his call number and the credit in his account, for example "your call number is 06 55 20 21 22, your account has a credit of 100 Francs".

The customer is then assigned a call number that he will keep under specific conditions specified elsewhere.

When the customer wants to credit his account, he purchases a new card and performs the previous manipulation again. At the end of this operation, the customer is informed of the new credit corresponding to the amount of the previous credit plus the new credit.

The customer can call the service server at any time in order to know his call number and the credit remaining on his account.

When implementing the process according to the invention, the network receives firstly a remote personalization request from a terminal characterized by an equipment identity number (IPEI) unknown to the database.

During this remote personalization, when an access right is received with a terminal equipment identity number that is a characteristic of the equipment, the network must determine if:

this equipment identity number corresponds to a terminal that has previously taken out a standard subscription;

this equipment identity number corresponds to a terminal that has already operated in prepayment mode, is known to the service database, and already has a previously allocated user identity number that is a characteristic of the customer, and a telephone number for incoming calls;

this equipment identity number corresponds to a terminal unknown to the service database, does not correspond to a terminal that has taken out a subscription, and is therefore registering with the network for the first time to operate in prepayment mode.

A distinction is then made between three steps in crediting the terminal account.

Step 1

The network assigns a user identity number (IPUI) and a directory number to this terminal;

the network sends an acknowledgment for the access right request containing the user identity number (IPUI), to the terminal;

the network assigns a telephone number associated with the user identity number, in its database;

the user sets a subscription flag T to be equal to "pending remote personalization" (T flag="pending").

Step 2

The network receives a call from the terminal; this message contains the user identity number and the account number obtained by scratching the card;

the network searches for the user identity number in the database and verifies that the T flag is equal to "pending";

starting from the account number, the network searches for the authentication key and the credit associated with the account;

the network initiates the key allocation procedure;

after this procedure, the network stores the long user authentication key (UAK), the user identity number (IPUI), the equipment identity number (IPEI), the authentication code (AC) and the account number; these data are kept if the remote personalization does not take place correctly;

if the authentication is correct, the network sends a voice message to the terminal indicating the new credit and the call number associated with the terminal;

the network sets the subscription flag T to be equal to "remote personalized" (T flag="Remote personalized").

Step three

During the first subsequent authentication (outgoing call, localization or incoming call):

the network checks that the value of the T flag=is actually "remote personalized";

if the authentication is correct, the network actually credits the terminal account, it erases the authentication code AC and the associated account number and sets the T flag equal to "subscription certified" (T flag= "certified").

For subsequent outgoing calls, after correct authentication, the network is capable of:

checking that the terminal has sufficient units to make the call;

sending voice messages to inform the customer when he has exceeded specific threshold (for example "only 50 units left, etc.");

cutting off the current call if the terminal has used all these units;

decrementing units used at the end of the call and updating the remaining credit.

When the customer wants to credit his account, he enters a new authentication code AC given on a new scratch card, and then:

the network receives a call containing an access right request; this message contains the equipment identity number of the terminal;

the network searches for this equipment identity number in the database; it finds the user identity number assigned during the first access;

it sends the "Access right acceptance" message containing the user identity number to the terminal.

The next steps take place in exactly the same way as the second third steps described above.

When the first authentication is made with the new user authentication key UAK calculated from the authentication code AC, the credit is actually made on the terminal account.

The call number allocated during the first access no longer changes afterwards.

The customer can call the voice server at any time in order to determine his call number and the credit remaining on his account.

Figure 3:
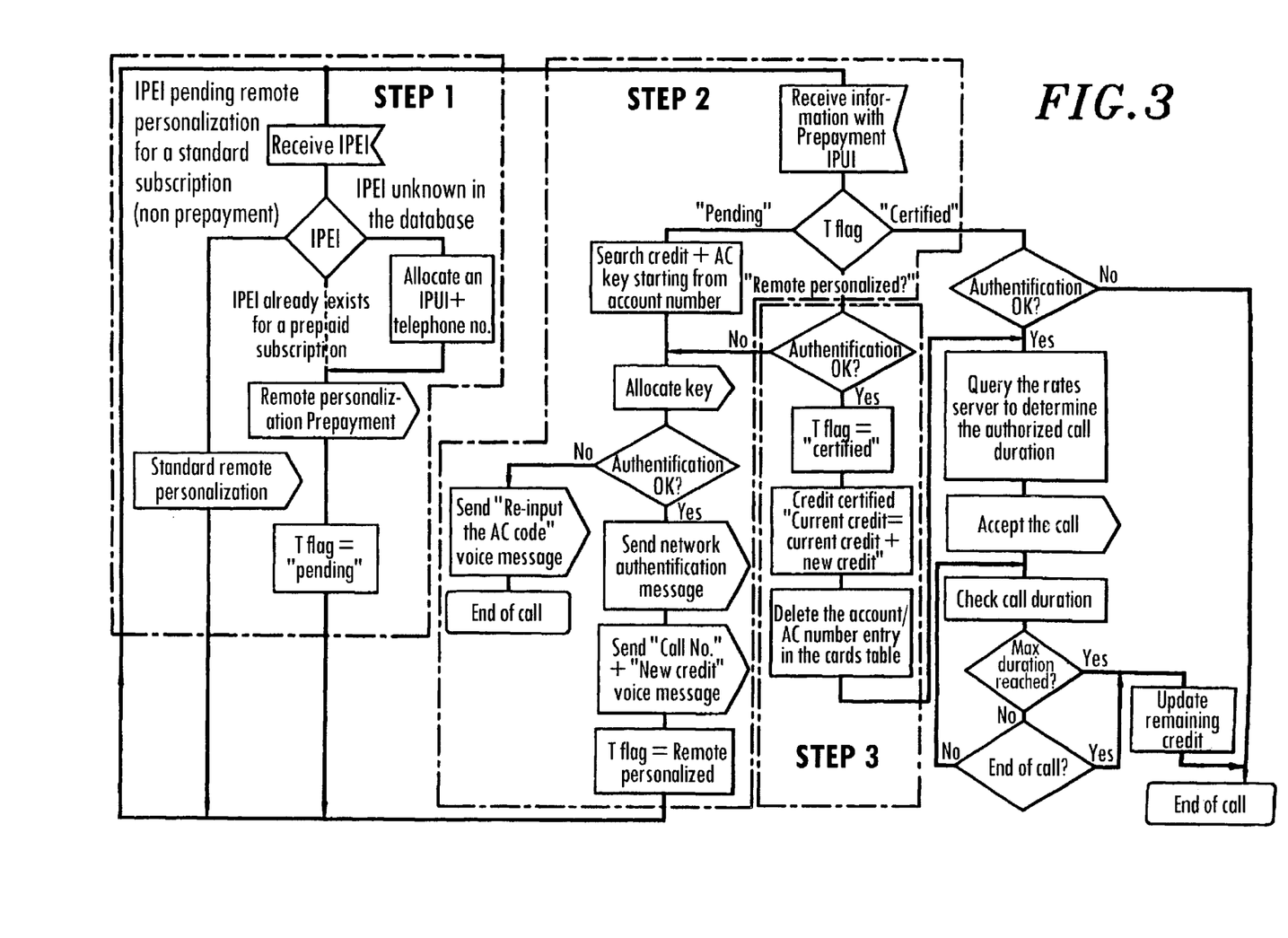
FIG. 3 is a flowchart illustrating operation of the process according to the invention.

The flowchart shown in FIG. 3 illustrates an example operation of the process according to the invention as described above, and particularly the different values of the T flag.

The appendices given below illustrate an example embodiment of message sequences.

Appendix A illustrates the first step for:
    the first sequence (handset unknown to the network) with remote personalization and prepayment;
    the $N^{th}$ recording (handset known to the network);

Appendix B illustrates the second step for:
    the first outgoing call (after "acceptance of entry right") in order to charge the account.

Appendix C illustrates the third step for:
    the second outgoing call in prepayment mode.

Appendix D illustrates a subsequent standard call ($N^{th}$ outgoing call in prepayment mode).

GLOSSARY

| | |
|---|---|
| PHS | Personal cordless telephone system (Japan) |
| DECT | European Digital Electronic Cordless Telephone standard |
| CT2 | Second generation cordless telephone system |
| BDS | Service Database |
| SGS | Service Management System |
| PCS-R | Service-Network Control Point |
| CTM | Cordless mobile system |
| IPEI | International personal equipment identity number (Ser. No.) |
| IPUI | International personal user identity number |
| AC | Authentication code |
| UAK | User Authentication key |
| SIM | Subscriber Identification Module |
| IS-XX | Interim Standard-xx |
| PHS | Personal Handling System |

What is claimed is:

1. A process for dynamic management of subscription data for a terminal conforming with a radio transmission standard for downloading data through a radio channel in a "prepaid" mode, the terminal connectable to a telecommunications network comprising at least one network server, said process comprising the steps of:
    a customer acquiring an authentication key for recording the terminal on the network;
    the customer also acquiring an account number for use by the network for crediting a customer account, the account number acquired by the customer in the same manner as the authentication key;
    completing a first access to the network from the terminal comprising the steps of:
        submitting a remote personalization request from the terminal including the steps of:
            entering the authentication key; and
            downloading an identity through the network into the terminal so that the terminal can be recognized by the network;
        calling the network server from the terminal with the terminal indicating its identity, wherein the user then enters the account number, and
    the network authenticating the terminal, and if the terminal is authenticated, the network sending a voice message to the terminal indicating a call number associated with the terminal and indicating any remaining credit in the customer account.

2. The process according to claim 1, further comprising the step of verifying the authentication of the terminal, wherein the network providing credit to the customer account after the verifying step.

3. The process according to claim 2, wherein the authentication key and the account number are provided to the customer hidden on a prepaid card.

4. The process according to claim 3, wherein the authentication key and the account number are displayed to the customer by scratching off a material that is used to hide the numbers.

5. The process according to claim 2, wherein the step of submitting a remote personalization request includes the steps of:
    the terminal sending an equipment identity number (IPEI) to the network;
    the network assigning a personal user identity number (IPUI) and a directory number to the terminal;
    the network sending an acknowledgment to the terminal concerning a request for access rights, the acknowledgment including the user identity number;
    the network assigning a telephone number associated with the user identity number in a network database;
    the network setting a subscription flag T to represent "pending".

6. The process according to claim 5, wherein the terminal indicates its identity by providing the network with the user identity number, and further wherein, when the network receives the call from the terminal indicating its identity, the terminal also provides the account number to the network, wherein the network server performs the steps of:
    searching for the user identity number in the network database and checking that the value of the subscription flag T represents "pending";
    searching for an authentication key and the credit associated with the account starting from the account number;
    initiating a key allocation procedure;
    storing the authentication key, the user identity number, the equipment identity number, an authentication code, and the account number, wherein these data are stored in case the remote personalization request does not take place correctly;
    wherein, if the authentication is correct, the network sends a voice message to the terminal indicating any credit in the account and the call number associated with the terminal; and
    the network setting the subscription flag T to represent "remote personalized".

7. The process according to claim 6, wherein the step of verifying the authentication of the terminal includes the step of the network verifying that the value of the subscription flag T represents "remote personalized", wherein, if the authentication is verified, the network performing the steps of:
    adding credit to the account,
    erasing the authentication code and the associated account number; and
    setting the subscription flag T to represent "subscription certified".

8. The process according to claim 7, wherein, after the authentication is verified, the network is capable of performing following steps:

verifying that the customer account has sufficient credit to make a communication call, sending a voice message to inform the customer that he has exceeded a threshold;

cutting off the communication call from the terminal if all credit has been exhausted from the customer account; and decrementing an amount of credit from the customer account in response to the communication call and updating the remaining credit in the account.

9. The process according to claim 8, wherein, when the customer wants to add credit to the customer account, the customer enters a new authentication code, wherein the network performs the steps of:

receiving a call from the terminal, the call including an access right request having an equipment identity number of the terminal;

searching for the equipment identity number in the network database and finding the user identity number assigned during the first access; and sending an acceptance message including the user identity number to the terminal, wherein the call number associated with the terminal is not changed; and adding credit to the customer account in response to the terminal providing the network with a new account number.

10. The process according to claim 2, wherein, when the customer wants to add credit to the customer account, the customer enters a new authentication code, wherein the network performs the steps of:

receiving a call from the terminal, the call including an access right request having an equipment identity number of the terminal;

searching for the equipment identity number in the network database and finding the user identity number assigned during the first access; and sending an acceptance message including the user identity number to the terminal, wherein the call number associated with the terminal is not changed.

11. The process according to claim 1, further comprising the step of the customer being able to query a local server at any time to determine the call number and the credit remaining on the customer account.

12. A process for dynamic management of subscription data for a terminal conforming with a radio standard, so that data can be downloaded through a radio channel in a prepaid mode, within a telecommunications network comprising at least one server, wherein a customer in possession of the terminal acquires two hidden numbers, and wherein, when a first access to the network is made from this terminal, the following steps occur:

a first step of submitting a remote personalization request from the terminal by entering a first number, followed by downloading of an identity through the network into the terminal so that the terminal can be recognized, said step of submitting further including the steps of:

the network assigning a user identity number (IPUI) and a directory number to the terminal;

the network sending an acknowledgment to the terminal including the user identity number;

the network assigning a telephone number associated with the user identity number in a database; and the network setting a subscription flag T to represent "pending remote personalization";

a second step of calling the network from the terminal, said terminal indicating its identity, wherein the user then enters the second number, the network attempts to authenticate the terminal and if the terminal is authenticated, the network then sends a voice message to the terminal indicating a call number associated with the terminal and a credit remaining in a terminal account; and a third step of verifying the terminal authentication, wherein the network actually credits the terminal account at the end of this step;

wherein the two hidden numbers include the first number and the second number which are hidden on a prepaid card and which are displayed by scratching off a covering, and further wherein the first number is an authentication key and the second number is an account number.

13. The process according to claim 12, wherein the second step includes the following steps:

the network receiving a call from the terminal transmitting the user identity number and the account number;

the network searching for the user identity number in the database and checking that the value of the subscription flag T represents "pending remote personalization";

using the account number, the network searching for the authentication key and the credit associated with the terminal account;

the network initiating a key allocation procedure;

the network storing the authentication key, the user identity number, an equipment identity number, an authentication code and the account number, these data being stored in case the remote personalization does not take place correctly;

if the terminal authentication is verified, the network sending a voice message to the terminal indicating the credit amount in the terminal account and providing the call number associated with the terminal;

the network setting the subscription flag T to represent "remote personalized".

14. The process according to claim 13, wherein the third step includes the following steps during the authentication:

the network verifies that the value of the Subscription flag T represents "remote personalized", if the terminal authentication is verified, the network crediting the terminal account, erasing the authentication code and the account number and setting the Subscription flag T to represent "subscription certified".

15. The process according to claim 14, wherein the network is capable of the following steps after correct authentication:

verifying that the terminal account has sufficient credit to make a call, sending voice messages to inform the customer that he has exceeded some thresholds, cutting off the call if the terminal account is depleted, decrementing credit from the terminal account at the end of the call and updating the remaining credit.

16. A process for dynamic management of subscription data for a terminal conforming with a radio standard, so that data can be downloaded through a radio channel in a prepaid mode, within a telecommunications network comprising at least one server, wherein a customer in possession of the terminal acquires two hidden numbers, and wherein, when a first access to the network is made from this terminal, the following steps occur:

a first step of performing a remote personalization request from the terminal by entering a first number which is an authentication code, followed by downloading of a user identity number through the network into the terminal so that the terminal can be recognized.

a second step of calling the network server from the terminal, with the terminal indicating its identity, wherein the user then enters a second number which is an account number, and further wherein the network attempts to authenticate the terminal, and if the terminal is authenticated, the network sending a voice message to the terminal indicating a call number associated with the terminal and a remaining credit in a terminal account, a third step of the network verifying the terminal authentication, with the network crediting the terminal account only after verification, wherein, when the customer wants to add credit to the terminal account, the following steps are performed:

the customer entering a new authentication code;

the network receiving a call from the terminal containing an access right request including an equipment identity number of the terminal;

the network searching for the equipment identity number in a database with the equipment identity number associated with the user identity number assigned during the first access; and the network sending an access right acceptance message including the user identity number to the terminal;

wherein the call number allocated during the first access is not changed.

* * * * *

UNITED STATES PATENT AND TRADEMARK OFFICE
CERTIFICATE OF CORRECTION

PATENT NO. : 6,434,379 B1  
DATED : August 13, 2002  
INVENTOR(S) : François Despres et al.

It is certified that error appears in the above-identified patent and that said Letters Patent is hereby corrected as shown below:

Column 2,  
Lines 24-25, after "calls.", please delete "...anybody who would like to remain accessible, while enabling a few calls.".

Column 3,  
Line 2, before "authentication", please delete "...".

Column 6,  
Line 33, please delete "flag=is", and insert therefor -- flag is --.

Column 11,  
Line 5, please delete ",", and insert therefor -- , --.

Please insert the attached Appendices A-D to the end of the patent.

Signed and Sealed this

Seventeenth Day of December, 2002

JAMES E. ROGAN  
*Director of the United States Patent and Trademark Office*

APPENDICES

A/ DESCRIPTION OF MESSAGE SEQUENCES

*1/ First registration (handset unknown to the network)*
*Remote personalization (access right) prepayment*

| Handset | Radio terminal | Network | |
|---|---|---|---|
| Enter AC on the keypad | Request access right | Request access right (X25) | |
| | IPEI | IPEI | IPEI unknown in the table of subscriptions pending remote personalization and IPEI unknown in the base of subscribers with prepaid formula. Choose an IPUI and an unassigned telephone number. Tflag = <pending> |
| Accept access rights | Accept access right | Accept access right (X25) | |
| | IPUI | IPUI | |

2/ N<sup>th</sup> registration (handset unknown to the network)

| Handset | Radio terminal | Network | |
|---|---|---|---|
| Enter AC on the keypad | Request access right | Request access right (X25) | |
| | IPEI | IPEI | IPEI unknown in the table of subscriptions pending remote personalization and IPEI known in the base of subscribers with prepaid formula.<br>Note the previously assigned IPUI.<br>Tflag = <pending> |
| Accept access rights | Accept access right | Accept access right (X25) | |
| | IPUI | IPUI | |

B/ FIRST OUTGOING CALL (DEPENDING ON ACCESS RIGHT) IN ORDER TO CREDIT THE ACCOUNT

| Handset | Radio terminal | Network |
|---|---|---|
| SETUP<br>IPUI | SETUP (PCS access number) | |
| | CALLING | |
| | CALL ROUTED | |
| CONNECTION | CONNECTION | |
| | Voice | |
| INFORMATION<br>Account number | INFORMATION = (Facility)<br>IPUI<br>Account number | IPUI with prepayment with T flag = \<pending\>: search AC + credit in the valid cards table starting from the account No. |
| ALLOCATE KEY<br>(1) | ALLOCATE KEY (Facility) | |
| AUTHENTICATION REQUEST | AUTHENTICATION REQUEST (Facility)<br>IPUI | |
| AUTHENTICATION RESULT | AUTHENTICATION RESULT (Facility) | |
| Voice message(*) | — | |
| RELEASE CONNECTION | RELEASE CONNECTION | |
| | RELEASE | |
| RELEASE COMPLETE | CONFIRM RELEASE | |

(*) Calculate authentication key

Your new credit is X Francs

Your number is xx xx xx xx xx

C/ SECOND OUTGOING CALL PREPAYMENT

| Handset | Radio terminal | Network | |
|---|---|---|---|
| SETUP<br>IPUI | SETUP (PCS access number) | | |
| | CALLING | | |
| | CALL ROUTED | | |
| CONNECTION | CONNECTION | | |
| | Voice | | |
| INFORMATION<br>Called number | INFORMATION = (Facility)<br>IPUI<br>Called number | The value of IPUI determines the subscription type if T flag = remote personalized. | |
| AUTHENTICATION REQUEST | AUTHENTICATION REQUEST<br>(facility)<br>IPUI | | |
| AUTHENTICATION RESPONSE | AUTHENTICATION RESPONSE<br>(facility) | Query the rates server to determine the authorized call time | |
| ENCRYPTION REQUEST | INFORMATION - (Alert) | If authentication correct, validate IPUI. T flag = certified | |
| | State of the voice message service<br>Remaining credit | Certified credit. Delete the entry corresponding to the account number from the valid cards table | |
| CALLING<br>ALERT | | Check the time spent during the call | |
| RELEASE CALL | RELEASE CONNECTION<br>RELEASE | | |
| RELEASE COMPLETE | CONFIRM RELEASE | Update remaining credit | |

D/ $N^{th}$ OUTGOING CALL PREPAYMENT

| Handset | Radio terminal | Network |
|---|---|---|
| SETUP<br>IPUI | SETUP (PCS access number) | |
| | CALLING | |
| | CALL ROUTED | |
| CONNECTION | CONNECTION | |
| | Voice | |
| INFORMATION<br>Called number | INFORMATION = (Facility)<br>IPUI<br>Called number | The value of IPUI determines the subscription type if T flag = certified. |
| AUTHENTICATION<br>REQUEST | AUTHENTICATION REQUEST<br>(facility)<br>IPUI | |
| AUTHENTICATION<br>RESPONSE | AUTHENTICATION RESPONSE<br>(facility) | Query the rates server to determine the authorized call time |
| ENCRYPTION REQUEST | ENCRYPTION REQUEST -<br>(Alert) | If authentication correct, validate IPUI. T flag = certified |
| | State of the voice message service<br>Remaining credit | |
| CALLING<br>ALERT | | Check the time spent during the call |
| RELEASE CALL | RELEASE CONNECTION<br>RELEASE | |
| RELEASE COMPLETE | CONFIRM RELEASE | Update remaining credit |